(12) United States Patent
Ouchi

(10) Patent No.: US 11,470,554 B2
(45) Date of Patent: Oct. 11, 2022

(54) COMMUNICATION APPARATUS AND CONTROL METHOD THEREOF

(71) Applicant: CANON KABUSHIKI KAISHA, Tokyo (JP)

(72) Inventor: Masatomo Ouchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/865,490

(22) Filed: May 4, 2020

(65) Prior Publication Data

US 2020/0359326 A1    Nov. 12, 2020

(30) Foreign Application Priority Data

May 8, 2019   (JP) .............................. JP2019-088573

(51) Int. Cl.
*H04W 52/02* (2009.01)
*H04W 8/02* (2009.01)
*H04W 84/12* (2009.01)
*H04W 48/08* (2009.01)
*H04W 48/16* (2009.01)

(52) U.S. Cl.
CPC ......... *H04W 52/0235* (2013.01); *H04W 8/02* (2013.01); *H04W 84/12* (2013.01)

(58) Field of Classification Search
CPC ... H04W 52/0235; H04W 8/02; H04W 84/12; H04W 48/08; H04W 48/16; Y02D 30/70
USPC .......................................................... 370/311
See application file for complete search history.

(56) References Cited

U.S. PATENT DOCUMENTS

| | | | |
|---|---|---|---|
| 2018/0242249 A1* | 8/2018 | Yang | H04W 52/0216 |
| 2019/0075519 A1* | 3/2019 | Li | H04W 52/028 |
| 2020/0053649 A1* | 2/2020 | Yao | H04W 52/02 |
| 2020/0288398 A1* | 9/2020 | Ouchi | H04W 40/244 |
| 2020/0344695 A1* | 10/2020 | Wang | H04W 52/0274 |
| 2020/0404589 A1* | 12/2020 | Wang | H04W 52/0235 |

* cited by examiner

*Primary Examiner* — Inder P Mehra
(74) *Attorney, Agent, or Firm* — Venable LLP

(57) ABSTRACT

A communication apparatus that operates as an access point in compliance with IEEE 802.11ba and communicates with a WUR (Wake-Up Radio) function for transiting a terminal from a power saving state to a normal state, comprises a collection unit that collects, from another access point, information related to a WUR of the other access point; and a notification unit that notifies the terminal of the information related to the WUR of the other access point collected by the collection unit.

12 Claims, 16 Drawing Sheets

FIG. 3

INFORMATION ELEMENTS RELATED TO IEEE 802.11ba
THAT CAN BE INCLUDED IN A MANAGEMENT FRAME OF IEEE 802.11

|  | WUR Capabilities | WUR Operation | WUR Discovery |
|---|---|---|---|
| Beacon | O | O | O |
| Association Request | O | | |
| Association Response | O | O | |
| Reassociation Request | O | | |
| Reassociation Response | O | O | |
| Probe Request | O | | |
| Probe Response | O | O | O |

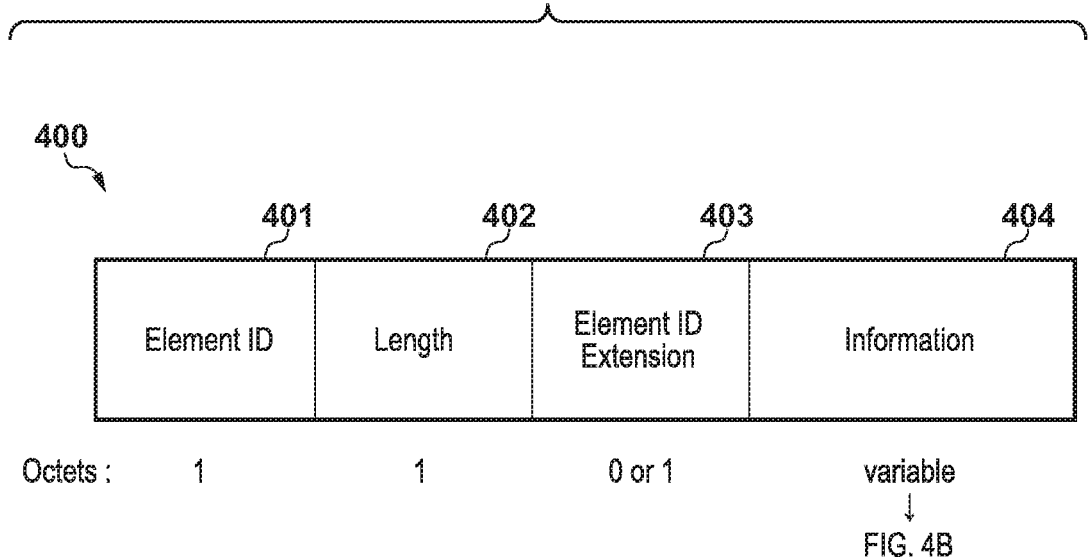

F I G. 5B

Table 5a (511):

| Type | Type description |
|---|---|
| 0 | WUR Beacon |
| 1 | WUR Wake-up |
| 2 | WUR Vendor Specific |
| 3 | WUR Discovery |
| 4-7 | Reserved |

Table 5b:

| Operating Class (531) | Global operating class (541) | Channel starting frequency (GHz) (542) | Channel spacing (MHz) (543) | Channel set (544) | Channel center frequency index (545) | Behavior limits set (546) |
|---|---|---|---|---|---|---|
| 1 | 115 | 5 | 20 | 34,38,42,46, 36,50,44,48 | — | |
| ... | | | | | | |
| 41 | 81 | 2.507 | 25 | 1,2,3,4,5,6,7,8,9, 10,11,12,13 | — | License Exempt Behavior |
| 141-255 | Reserved | Reserved | Reserved | Reserved | Reserved | Reserved |

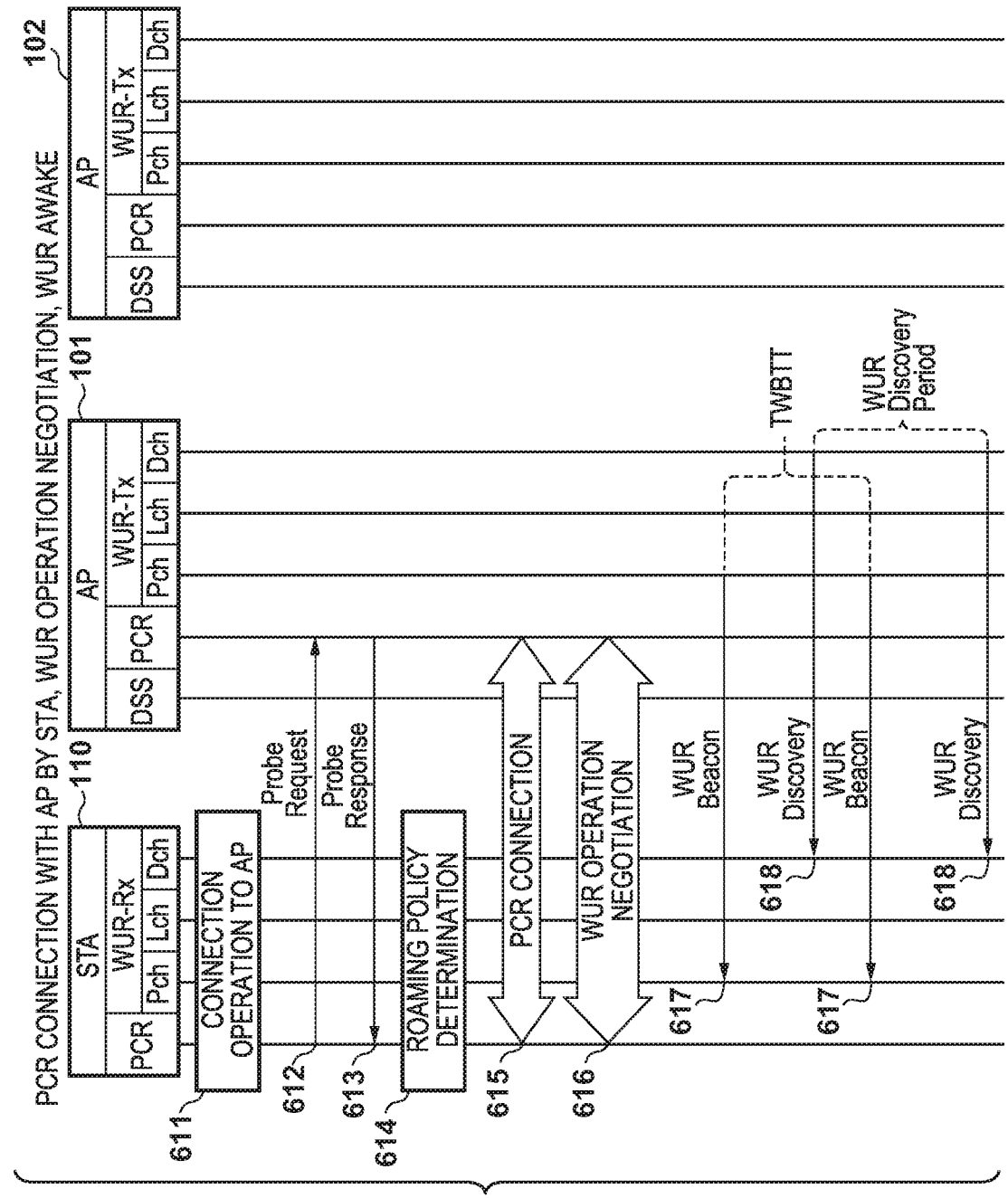
F I G. 6B

F I G. 7

| Index | Transmitting WUR AP 701 | WUR Discovery Channel 702 | WUR ID 703 | short-SSID 704 | BSSID 705 706 | WUR Discovery Period 707 | THE MOST RECENT DATE AND TIME OF WUR Discovery frame RECEPTION 708 | OBTAINMENT METHOD OF WUR Discovery period 709 | Compressed SSID 710 | Operating Class 711 | Channel 712 |
|---|---|---|---|---|---|---|---|---|---|---|---|
| 0 | 1 | 1 | ID00 | aa aa aa aa | 00 00 85 00 00 01 | 00 10 | — | SETTING VALUE | aa ac | 41 | 6 |
| 1 | 0 | 1 | ID01 | aa aa aa aa | ff ff ff ff ff ff | 00 03 | — | DIRECT | aa ax | 41 | 11 |
| 2 | 0 | 40 | ID02 | aa aa aa aa | ff ff ff ff ff ff | 00 04 | — | CALCULATED | aa ay | 1 | 40 |
| 3 | 0 | 40 | ID03 | 00 00 00 00 | ff ff ff ff ff ff | 00 04 | — | — | aa aa | 1 | 40 |
| 4 | 0 | 44 | ID04 | 00 00 00 00 | ff ff ff ff ff ff | 00 00 | — | — | aa ac | 1 | 44 |
| 5 | 0 | 44 | ID05 | aa aa aa aa | ff ff ff ff ff ff | 00 00 | — | — | aa aa | 1 | 44 |
| 6 | 0 | 44 | ID06 | 00 00 00 00 | ff ff ff ff ff ff | 00 60 | — | — | aa aa | 1 | 40 |
| 7 | 0 | 149 | ID07 | 00 00 00 00 | 00 00 85 00 00 02 | 00 00 | — | — | 00 00 | 1 | 48 |
| 8 | 0 | 153 | ID08 | 00 00 00 00 | ff ff ff ff ff ff | 00 08 | — | — | aa aa | 1 | 36 |
| 9 | 0 | 153 | ID09 | 00 00 00 00 | 00 00 85 00 00 01 | 00 06 | — | — | aa aa | 1 | 48 |
| 10 | 0 | 153 | ID10 | aa aa aa aa | 00 00 85 00 00 02 | 00 04 | — | — | aa aa | 1 | 36 |
| 11 | 0 | 153 | ID11 | aa aa aa aa | 00 00 85 00 00 03 | 00 02 | — | — | aa aa | 1 | 48 |

700

F I G. 8C
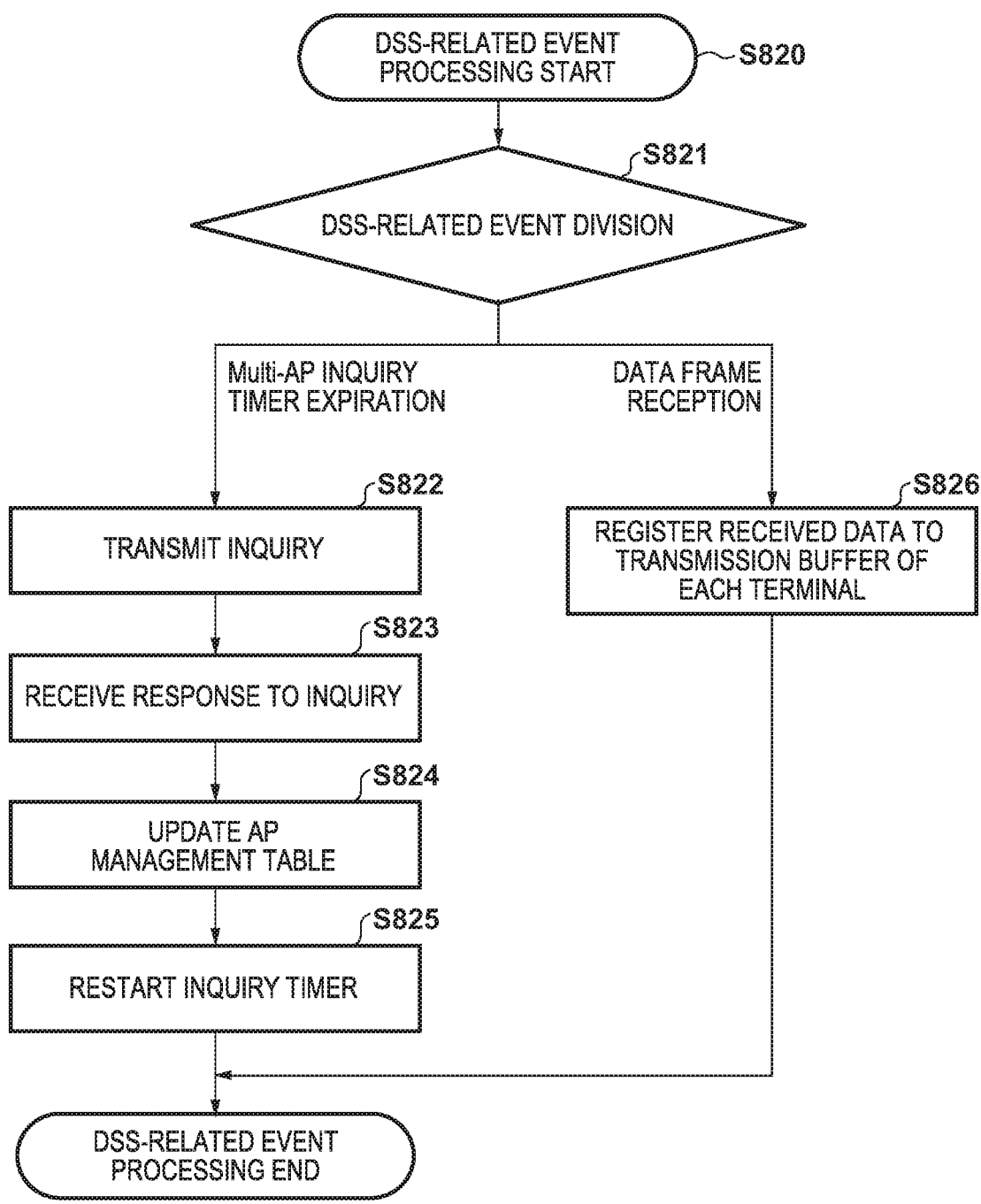

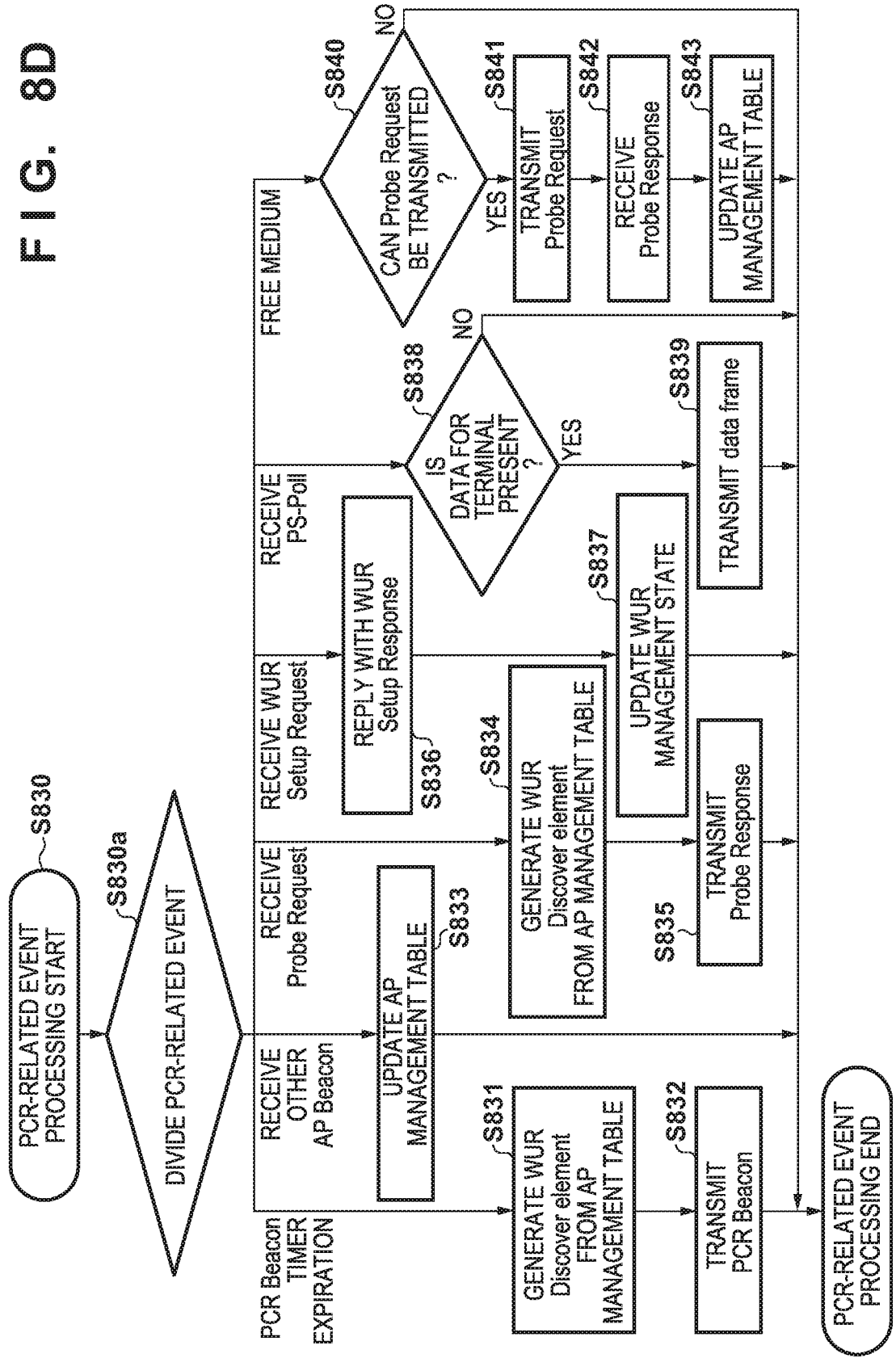

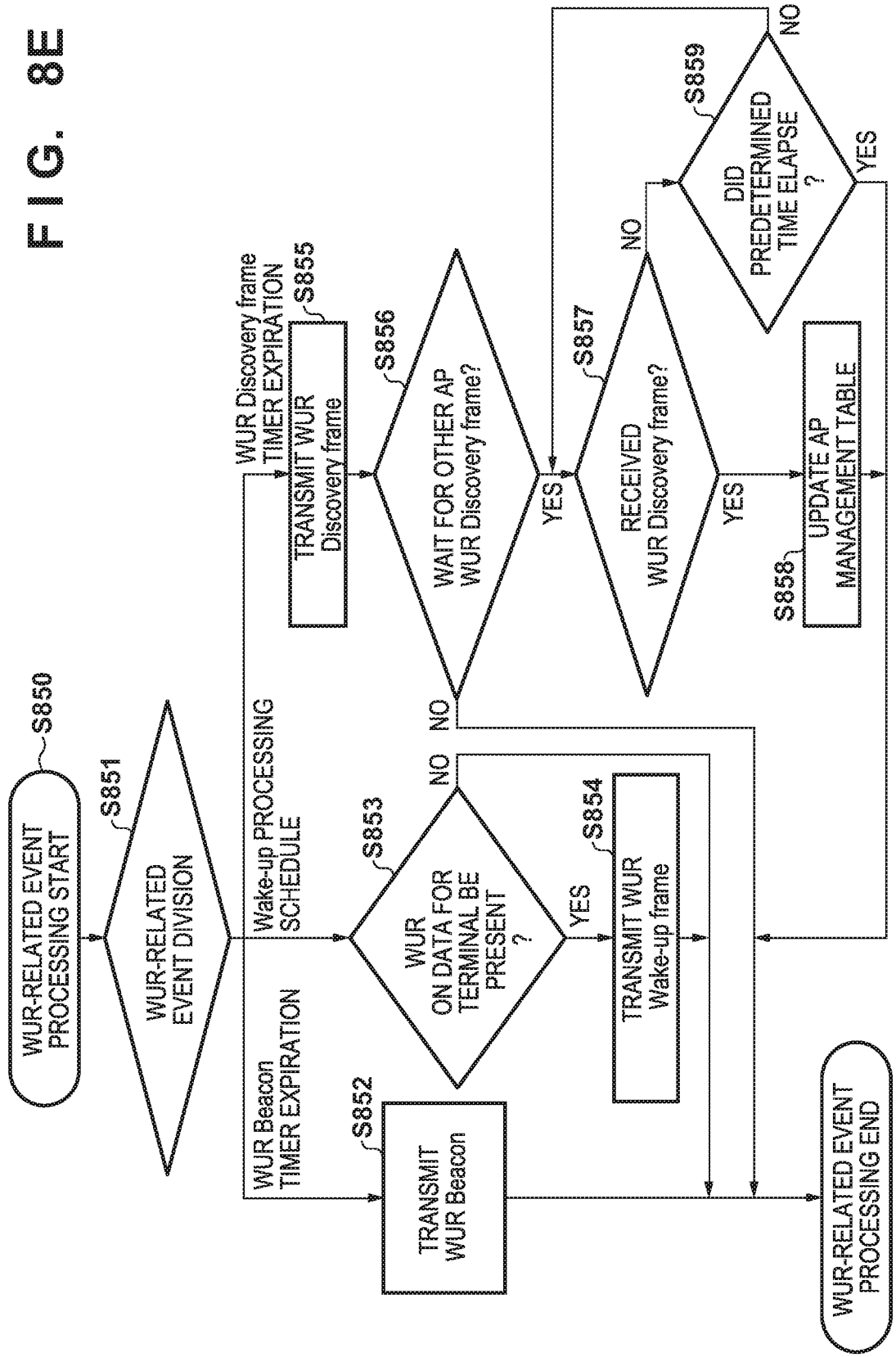

COMMUNICATION APPARATUS AND CONTROL METHOD THEREOF

BACKGROUND OF THE INVENTION

Field of the Invention

The present invention relates to a communication apparatus for performing wireless communication and a control method thereof.

Description of the Related Art

In recent years, the IEEE 802.11ba standard is under consideration by IEEE (Institute of Electrical and Electronics Engineers). In the IEEE 802.11ba standard, a WUR (Wake-UP Radio) circuit is arranged separately from a PCR (Primary Connectivity Radio) which is an RF (Radio Frequency) circuit for improving power saving features. According to US-2018-0242249, a power saving function is implemented by transiting the PCR from a power saving state to a normal state when the WUR circuit has received a wireless frame.

Upon discovering that a wake-up cannot be executed in a first access point, a terminal may connect to a second access point (roaming). However, there is no proposal for a method by which the first access point or the terminal can grasp the information to be used by the terminal to connect to the second access point.

SUMMARY OF THE INVENTION

The present invention provides a technique that allows a terminal to collect information to roam from a connected access point to another access point.

According to one aspect of the present invention, there is provided a communication apparatus that operates as an access point in compliance with IEEE 802.11ba and communicates with a WUR (Wake-Up Radio) function for transiting a terminal from a power saving state to a normal state, comprising: a collection unit configured to collect, from another access point, information related to a WUR of the other access point; and a notification unit configured to notify the terminal of the information related to the WUR of the other access point collected by the collection unit.

According to another aspect of the present invention, there is provided a communication apparatus that operates as a terminal in compliance with IEEE 802.11ba and has a WUR (Wake-Up Radio) function for transiting from a power saving state and a normal state, comprising: a reception unit configured to receive, from a connected access point, notification of information related to a WUR of another access point; a roaming unit configured to roam from the connected access point to the other access point; and a determination unit configured to determine, based on the information related to the WUR of the other access point received by the reception unit, an access point to be a roaming destination of the roaming unit.

According to another aspect of the present invention, there is provided control method of a communication apparatus that operates as an access point in compliance with IEEE 802.11ba and communicates with a WUR (Wake-Up Radio) function for transiting a terminal from a power saving state to a normal state, comprising: collecting, from another access point, information related to the WUR of the other access point; and notifying the terminal of the collected information related to the WUR of the other access point.

According to another aspect of the present invention, there is provided a control method of a communication apparatus that operates as a terminal in compliance with IEEE 802.11ba and has a WUR (Wake-Up Radio) function for transiting from a power saving state and a normal state, comprising: receiving, from a connected access point, notification of information related to a WUR of another access point; roaming from the connected access point to the other access point; and determining, based on the received information related to the WUR of the other access point, an access point to be a roaming destination in the roaming.

According to another aspect of the present invention, there is provided a non-transitory computer-readable storage medium storing a program for causing a computer to execute a control method of a communication apparatus that operates as an access point in compliance with IEEE 802.11ba and communicates with a WUR (Wake-Up Radio) function for transiting a terminal from a power saving state to a normal state, comprising: collecting, from another access point, information related to the WUR of the other access point; and notifying the terminal of the collected information related to the WUR of the other access point.

According to another aspect of the present invention, there is provided a non-transitory computer-readable storage medium storing a program for causing a computer to execute a control method of a communication apparatus that operates as a terminal in compliance with IEEE 802.11ba and has a WUR (Wake-Up Radio) function for transiting from a power saving state and a normal state, comprising: receiving, from a connected access point, notification of information related to a WUR of another access point; roaming from the connected access point to the other access point; and determining, based on the received information related to the WUR of the other access point, an access point to be a roaming destination in the roaming.

According to the present invention, an access point that can collect information for a terminal to roam to another access point is provided.

Further features of the present invention will become apparent from the following description of exemplary embodiments (with reference to the attached drawings).

BRIEF DESCRIPTION OF THE DRAWINGS

FIG. 3 is a table showing information elements related to IEEE 802.11ba that can be included in a management frame;

FIG. 4A is a view for explaining a WUR discovery element;

FIG. 5B is a view for explaining the WUR discovery frame;

FIG. 6B is a sequence chart showing the operation sequence of wireless communication according to the embodiment;

FIG. 7 is a table showing an example of an AP management table;

FIG. 8C is a flowchart for explaining processing by the AP according to the embodiment;

FIG. 8D is a flowchart for explaining processing by the AP according to the embodiment; and FIG. 8E is a flowchart for explaining processing by the AP according to the embodiment.

DESCRIPTION OF THE EMBODIMENTS

Figure 1:
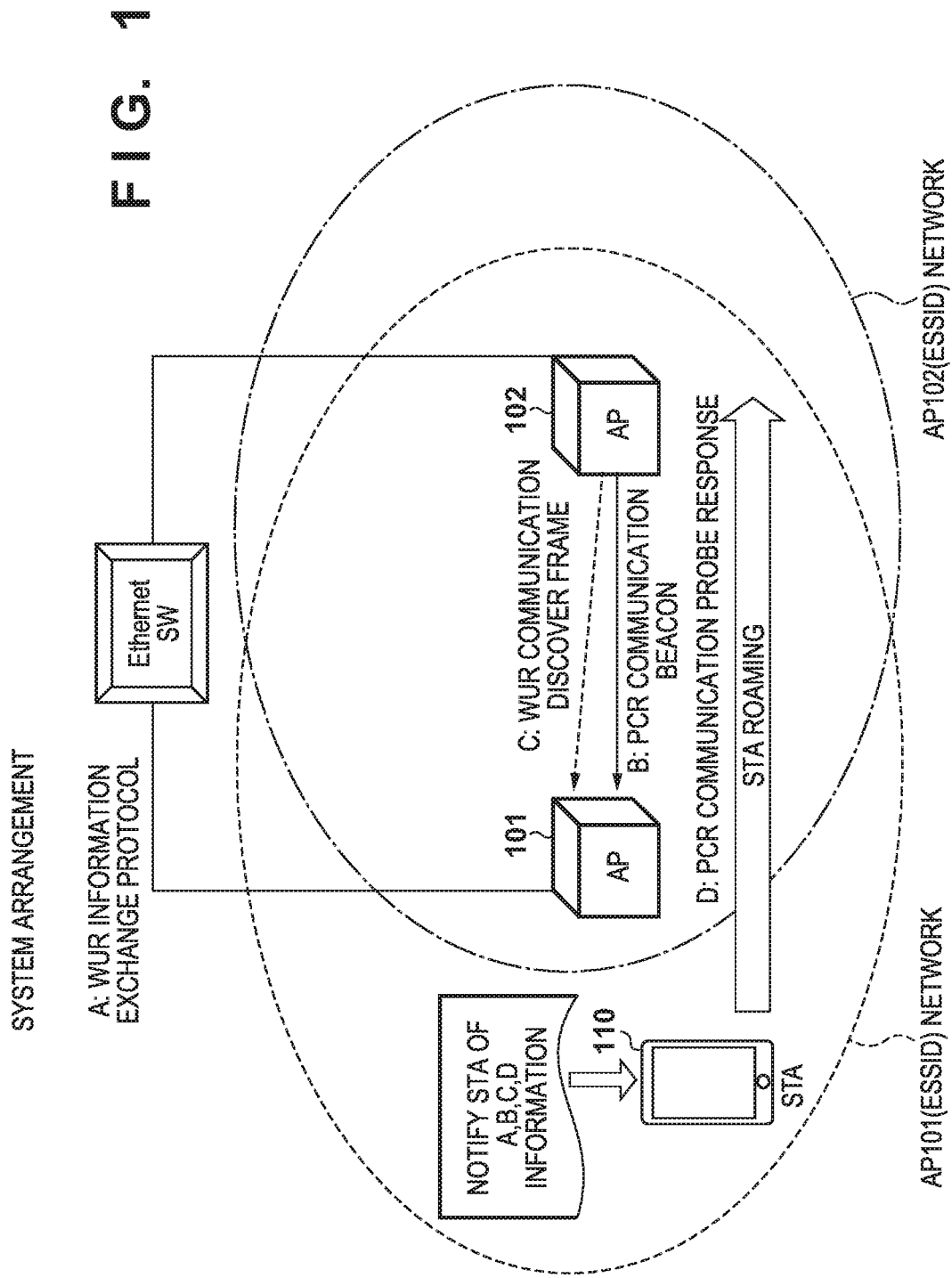
FIG. 1 is a view showing an example of the arrangement of a communication system according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In an embodiment, an access point collects and obtains information used by a station, in which a power saving mechanism operates, to perform roaming, that is, information used by the station to switch the connection to another access point.

FIG. 1 is a view showing the arrangement and the wireless network of a communication system according to the embodiment. In this specification, an access point and a station may be referred to as an AP and an STA, respectively. An AP 101 and an AP 102 are access points in compliance with IEEE 802.11ba. Assume that these two APs include the same ESSID (Extended Service Set IDentifier). An STA 110 is a wireless terminal (station) in compliance with IEEE 802.11ba. Note that other similar access points are present although they are not illustrated for the sake of descriptive convenience. In addition, other wireless terminals and wired terminals that communicate with the STA 110 via the AP 101 or the AP 102 can be present.

Figure 2:
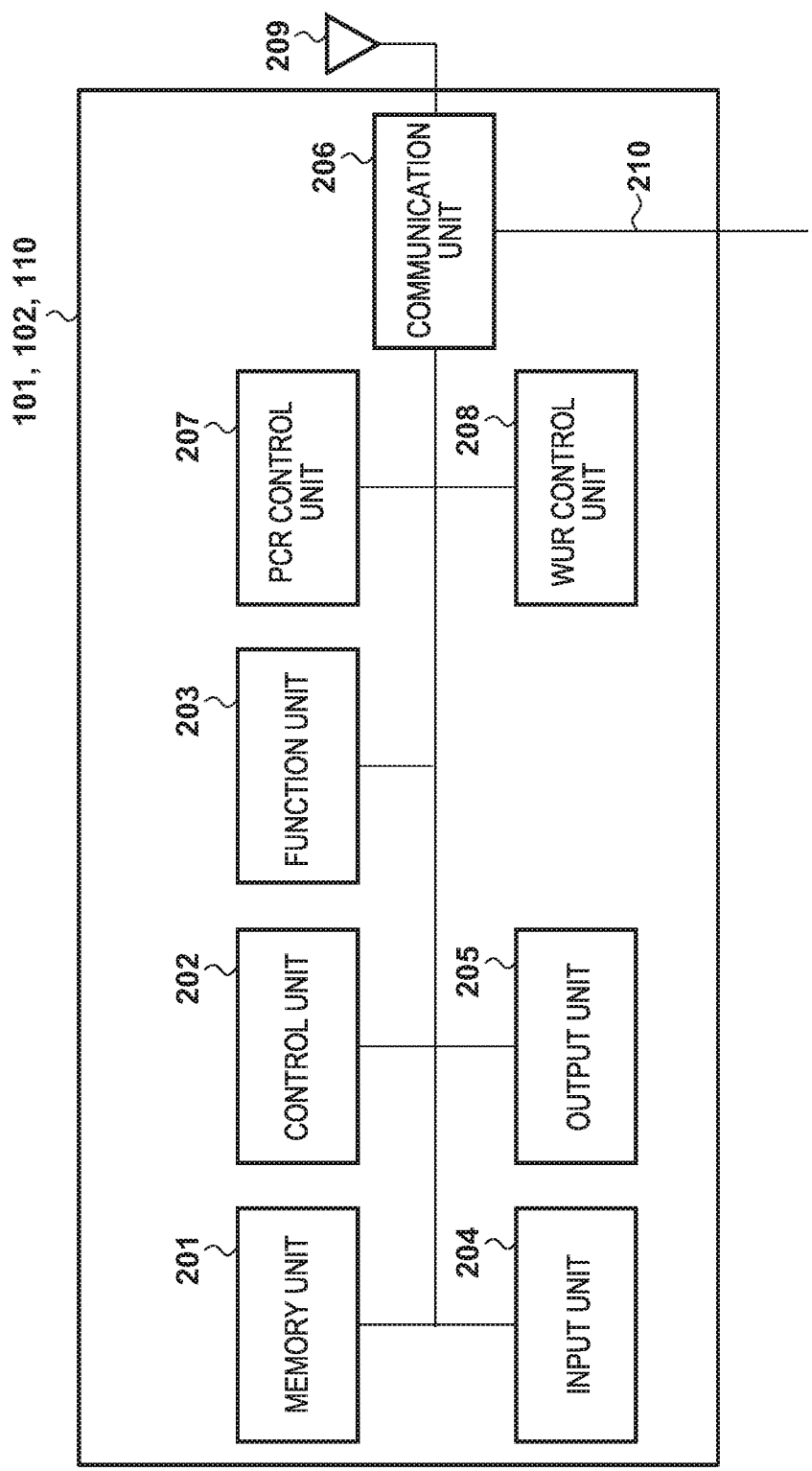
FIG. 2 is a block diagram showing an example of the hardware arrangement of a communication apparatus.

FIG. 2 shows an example of the arrangement of hardware common to the APs 101 and 102 in compliance with the IEEE 802.11ba and the STA 110 in compliance with the IEEE 802.11ba.

A memory unit 201 is formed by a memory such as a ROM, a RAM, or the like, and stores programs for executing various kinds of operations (to be described later) and various kinds of information such as communication parameters for wireless communication and the like. Note that other than a memory such as a ROM, a RAM, or the like, a storage medium such as a flexible disk, a hard disk, an optical disk, a magneto-optical disk, a CD-ROM, a CD-R, a magnetic tape, a nonvolatile memory card, a DVD, or the like can be used as the memory unit 201. The memory unit 201 may also include a plurality of memories or the like.

A control unit 202 is formed by a processor such as a CPU, an MPU, or the like and controls the overall apparatus by executing a program stored in the memory unit 201. Note that the control unit 202 may control the apparatus by causing the program stored in the memory unit 201 and an OS (Operating System) to cooperate. It may also be arranged so that the apparatus will be controlled by the control unit 202 that is formed by a plurality of processors such as a multicore processor or the like. The control unit 202 also controls a function unit 203 to execute predetermined processes such as an access point function, image capturing, printing, projecting, and the like. The function unit 203 is hardware used by the apparatus to execute the predetermined processes.

An input unit 204 accepts various kinds of operations performed by a user. An output unit 205 makes various kinds of outputs to the user. In this case, an output by the output unit 205 includes at least one of display on a screen, voice output from a loudspeaker, vibration output, and the like. Note that the input unit 204 and the output unit 205 may be implemented together by a single module such as a touch panel.

A communication unit 206 controls wireless communication in compliance with the IEEE 802.11 series standard or Wi-Fi, controls IP (Internet Protocol) communication, and the like. More specifically, the communication unit 206 can operate as an AP/STA in compliance with IEEE 802.11ba by switching a PCR control unit 207 or a WUR control unit 208. PCR is an abbreviation of Primary Connectivity Radio, and WUR is an abbreviation of Wake-Up Radio. In general, an AP which is in compliance with IEEE 802.11ba causes only the transmission function of the WUR to operate, and an STA which is compliance with IEEE 802.11ba causes only the reception function of the WUR to operate. Hence, in an AP-dedicated or STA-dedicated hardware arrangement, the WUR control unit 208 will have only a transmission function or a reception function. The functions are illustrated in common in FIG. 2 for the sake of descriptive convenience. Furthermore, the communication unit 206 controls an antenna 209 to exchange wireless signals for wireless communication.

Note that the PCR to be described in this specification is not a new hardware block. Hence, the "PCR control unit 207" may be referred to as a "conventional 802.11-based control unit 207" without using a special name. In a similar manner, "PCR" may be referred to as a "conventional IEEE 802.11" in this specification. In this case, "conventional" means "not in compliance with WUR of IEEE 802.11ba".

Reference numeral 210 denotes an interface to an Ethernet °, a public line, or the like. This is a portion that is enabled when the apparatus is to operate as an access point. Hence, the interface 210 is not present when the apparatus is to operate as an STA.

FIG. 3 shows information elements related to IEEE 802.11ba that can be included in management frames (for example, a beacon, an association request, and the like) of IEEE 802.11. The AP and the terminal can exchange information necessary for an 802.11ba operation by exchanging these frames. The outline of the information elements will be described hereinafter.

WUR capabilities are an information element indicating the STA capability of the WUR. The WUR capabilities include, for example, a transition time required to transit from the power saving state to the normal state of the PCR for each of "2.4 GHz" and "4.9 and 5 GHz".

A WUR operation is an information element used by an AP to notify an STA of the WUR operation state. The WUR operation includes, for example, a WUR channel (a channel notified of a WUR beacon) and a WUR beacon period. Note that a "channel" may be written as "ch" in this specification.

A WUR discovery is an information element for an AP to perform notification of WUR operating channels (WUR discovery channels) of "the AP" and "other APs". An STA can use this information to discover an AP (discovery) by waiting for a beacon or by transmitting a probe request by grasping the operating channels of the plurality of APs.

The frame of an information element related to a WUR discovery will be described in detail next with reference to FIGS. 4A and 4B. This information element includes information related to WUR discovery frame channels of a plurality of APs. A terminal that has received this information element can wait (scan) in this channel and grasp the PCR channels included in the received WUR discovery frame.

Figure 4B:
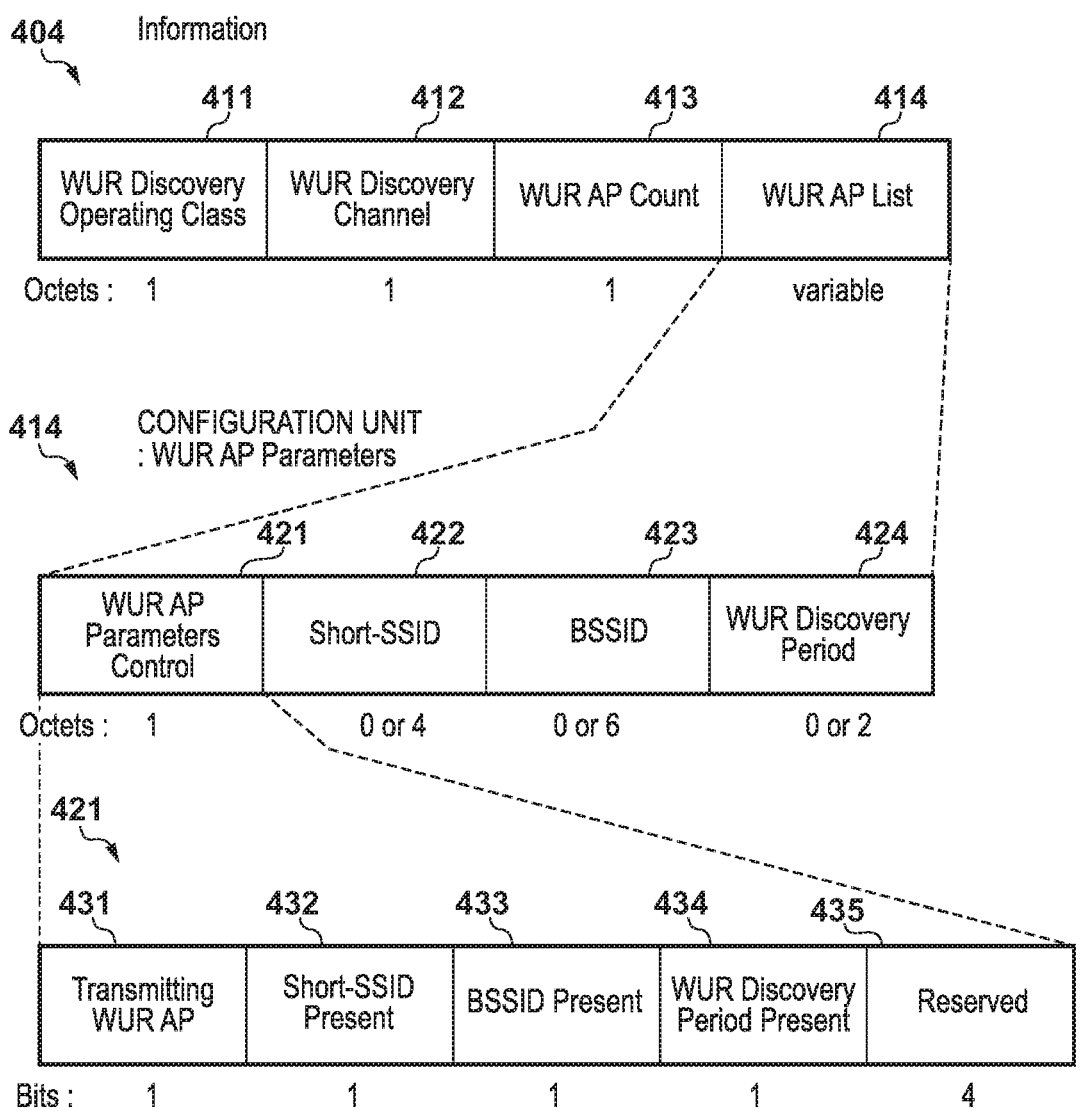
FIG. 4B is a view for explaining the WUR discovery element.

In FIG. 4A, reference numeral 400 shows the overall arrangement of an information element. Reference numeral 401 denotes an element ID, and the element ID holds, for example, a value in which an SSID (Service Set Identifier) is set to 0 (zero) and an information element related to a WUR is set to 255. Reference numeral 402 denotes a length of an information element. Reference numeral 403 is an element ID extension. In a WUR, 48 denotes the capabilities, 49 denotes the operation, 50 denotes the mode, and 51 denotes the discovery (see a table 420 of FIG. 4A). The length of Information 404 (contents of an information element) can change in accordance with the contents. Details of the information 404 are shown in a three-stage arrangement in FIG. 4B. The information 404 is also referred to as a WUR discovery element.

In FIG. 4B, a WUR discovery operating class 411 expresses a WUR discovery frame class value in compliance with the IEEE 802.11 standard. This will become one of the values of an operating class 531 which is to be described later in FIG. 5B. A WUR discovery channel 412 indicates a WUR discovery frame channel. A WUR AP Count 413 is a number obtained by subtracting 1 from a WUR AP parameter number included in a WUR AP list 414 (to be described later). One WUR AP parameter is present when this value is 0 (zero). The WUR AP list 414 includes one or more WUR AP parameters (to be described later).

Note that the information 404 is generate for each channel used by the WUR. For example, since there are five types (ch 1, ch 40, ch 44, ch 149, and ch 153) of WUR discovery channels (an item 703) in the case of FIG. 7 (to be described later), the information element 400 includes five pieces of information 404. For example, in the information 404 of WUR discovery channel=153, the WUR AP Count 413 is 3, and four APs are listed in the WUR AP list 414.

The WUR AP parameters included in the WUR AP list 414 are formed from the following four fields. Reference numeral 421 denotes a WUR AP parameters control field, and the presence/absence of the following three items is indicated in this field. Reference numeral 422 denotes a short-SSID field. This is a 32-bit numeric value calculated from an SSID and is defined by the IEEE 802.11ai standard. Reference numeral 423 denotes a BSSID (Basic Service Set Identifier) field. Reference numeral 424 denotes a WUR discovery period field, and a time interval (the unit is TU: Time Unit) in which a WUR discovery frame is transmitted is indicated.

Next, the subfield of the WUR AP parameters control 421 will be described in detail. Reference numeral 431 denotes a transmitting WUR AP subfield. The transmitting WUR AP subfield is a 1-bit value that is set to 1 when information of the AP which transmitted the information element is included, and is set to 0 when another piece of information is included. Reference numeral 432 denotes a short-SSID present subfield, and this subfield is set to 1 in a case in which a short-SSID of four octets (4 bytes or 32 bits) is included in the short-SSID field 422. Reference numeral 433 denotes a BSSID present subfield, and this subfield is set to 1 when a six-octet BSSID is included in the BSSID field 423 and is set to 0 otherwise. Reference numeral 434 denotes a WUR discovery period present subfield, and this subfield is set to 1 in a case in which the WUR discovery period field 424 includes a two-octet value and is set to 0 otherwise. Reference numeral 435 is a reserved subfield, and this subfield is an unused four-bit area.

Figure 5A:
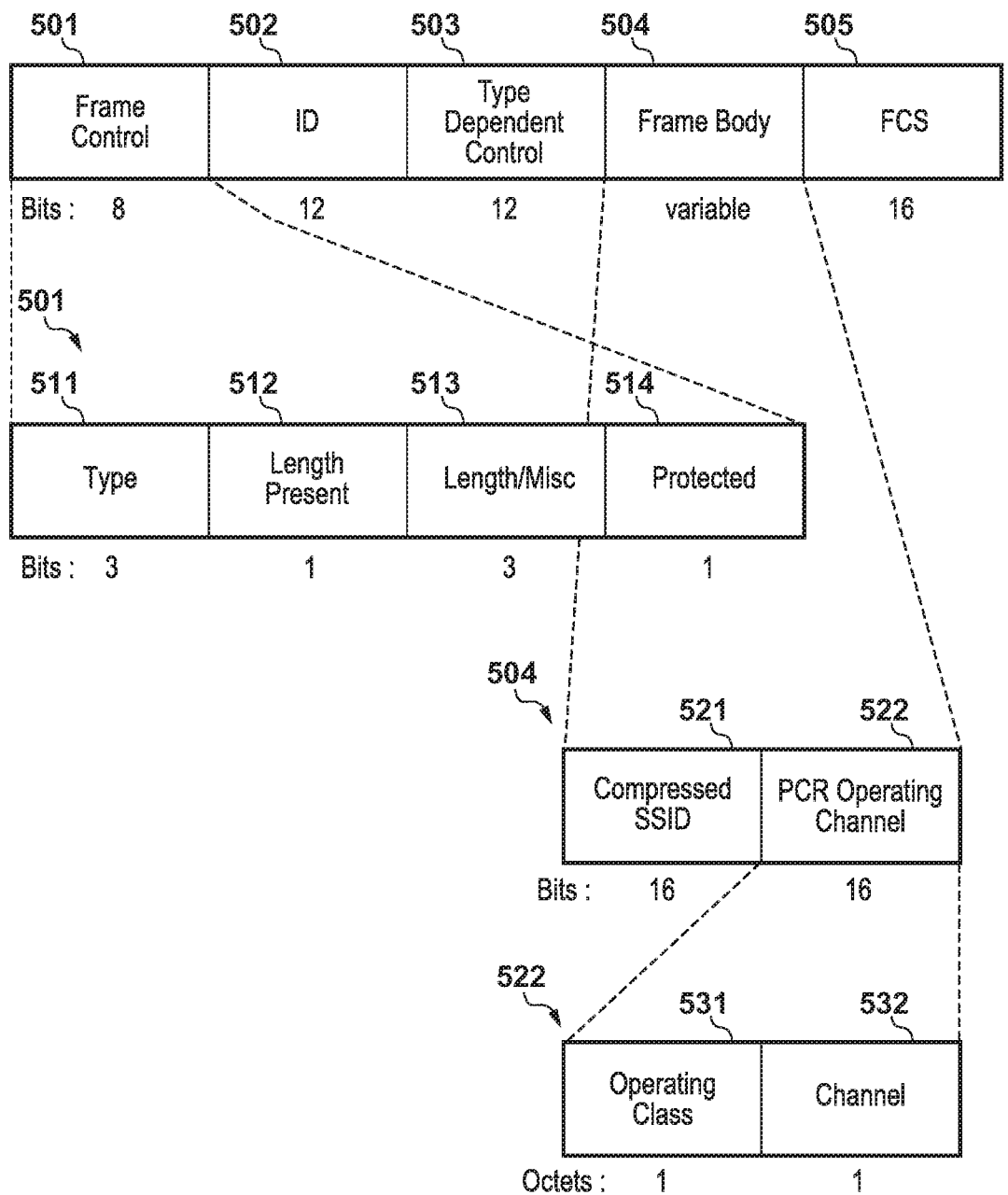
FIG. 5A is a view for explaining a WUR discovery frame.

The WUR discovery frame to be transmitted by the WUR function will be described next. FIG. 5A is a view showing an example of the data arrangement of the WUR discovery frame. In FIG. 5A, reference numerals 501 to 505 denote common components of a frame newly defined by IEEE 802.11ba.

The details of the frame control 501 (8 bits) will be described later. The value of the ID 502 (12 bits) is determined by a type 511 of a WUR frame. For example, in the case of a WUR discovery frame, the transmitter ID that transmitted the frame will be used. Reference numeral 503 denotes type dependent control (12 bits). Reference numeral 504 denotes a frame body (a variable length). Reference numeral 505 denotes an FCS (Frame Check Sequence) (16 bits).

Reference numerals 511 to 514 denote details of the frame control 501, and these components are also referred to as a MAC header. Reference numeral 511 denotes a type field (3 bits), and the details of this field are shown in a table 5a of FIG. 5B. In the WUR discovery frame related to this embodiment, the type 511 is "3". Reference numeral 512 denotes length present field (1 bit), and this field indicates whether the following length/misc field indicates a length. Reference numeral 513 denotes a length/misc field (1 bit), and this field indicates a length when the length present 512 is 1. Note that "misc" will be indicated when the length present 512 is 0, but the details are undetermined. Reference numeral 514 denotes a protected field (3 bits), and this field indicates whether a WUR frame is protected by an MIC (Message Integrity Check) algorithm. A case in which the protected field 514 is set to 1 indicates that the WUR frame is protected by MIC. A case in which the protected field 514 is set to 0 indicates that a CRC (Cyclic Redundancy Check) is included.

The frame body 504 includes a compressed SSID 521 and a PCR operating channel 522. The compressed SSID 521 is a 16-bit value of the LSB of a short-SSID (4 bytes). The PCR operating channel 522 is a 16-bit PCR operating channel. This PCR operating channel 522 is formed by two 8-bit areas. One area is the operating class 531, and the other area is a channel 532 (number). The contents of the operating class 531 are shown in a table 5b of FIG. 5B. Items 541 to 546 specified by the operating class 531 are items related to operation defined in common in the IEEE 802.11 standard. Note that the PCR operating channel 522 may simply be referred to as an "operating channel".

Information collection for roaming and a roaming operation according to this embodiment will be described next with reference to FIGS. 6A, 6B, and 6C. Abbreviations used in FIGS. 6A to 6C will be described first.

DSS which is a component of an AP is the abbreviation of a Distribution System Service, and is an interface for a DS (Distribution System) separate from the DS managed by the AP itself. In a general implementation, the interface 210 will be a wired LAN represented by an Ethernet. A WUR-Tx is a transmission function of three types of frames (beacon, wake-up, and discovery) of the WUR of an AP. This is implemented by the WUR control unit 208 and the communication unit 206.

Pch is the abbreviation of the WUR primary channel in this specification, and indicates a channel which is notified of a WUR beacon. The channel which is notified of this beacon is also referred to as a WUR channel. This WUR channel is a 1-octet number, and the WUR channel is an element of the WUR operation parameters of the WUR operation element (the WUR operation in FIG. 3).

Lch is the abbreviation of the WUR listen channel in this specification, and is a channel that waits (listens) for a WUR wake-up frame when the STA is in an WUR awake state. Lch is an element of the WUR operation parameters of the WUR operation element (the WUR operation in FIG. 3).

Dch is the abbreviation of the WUR discovery channel in this specification, and is a channel in which the WUR AP transmits a WUR discovery frame. The STA 110 can discover the PCR channel of the AP by receiving this frame. Note that in the IEEE 802.11ba standard, Dch is either channel 1 in the 2.4 GHz band or one of channels 40, 44, 149, and 153 in the 5 GHz band, and the WUR discovery channel 412 notifies the STA of this channel. The channels to be used as Pch, Lch, and Dch described above depend on the operation setting of the AP. Hence, it may be set so that all of the channels will be the same, two channels will be the same arbitrarily, or all of the channels will be different. Note that the AP will indicate the difference between Lch and Pch to the STA by a WUR channel offset in which the action type is set to "enter WUR mode response" or "enter WUR mode suspend response".

A WUR-Rx is the WUR reception function of the STA 110. This is implemented by the WUR control unit 208 and the communication unit 206. Note that although it has been noted as WURx in the development process of the IEEE 802.11ba standard, it will be noted as WUR-Rx in this specification for contrast with the WUR-Tx which indicates the transmission function of the AP. Also, in the IEEE 802.11ba standard, the AP is defined only as the transmitter of the WUR and the STA is defined only as the receiver of the WUR. Hence, in a device that has the functions of both AP and ST, a single physical terminal can have WUR transmission/reception functions. In such a case, it may simply be referred to as a WUR function instead of discriminating the functions as the WUR-Rx (WURx) function and the WUR-Tx function.

The processing sequence performed when the STA 110 roams from the AP 101 to the AP 102 will be described next with reference to FIGS. 6A, 6B, and 6C.

Figure 6A:
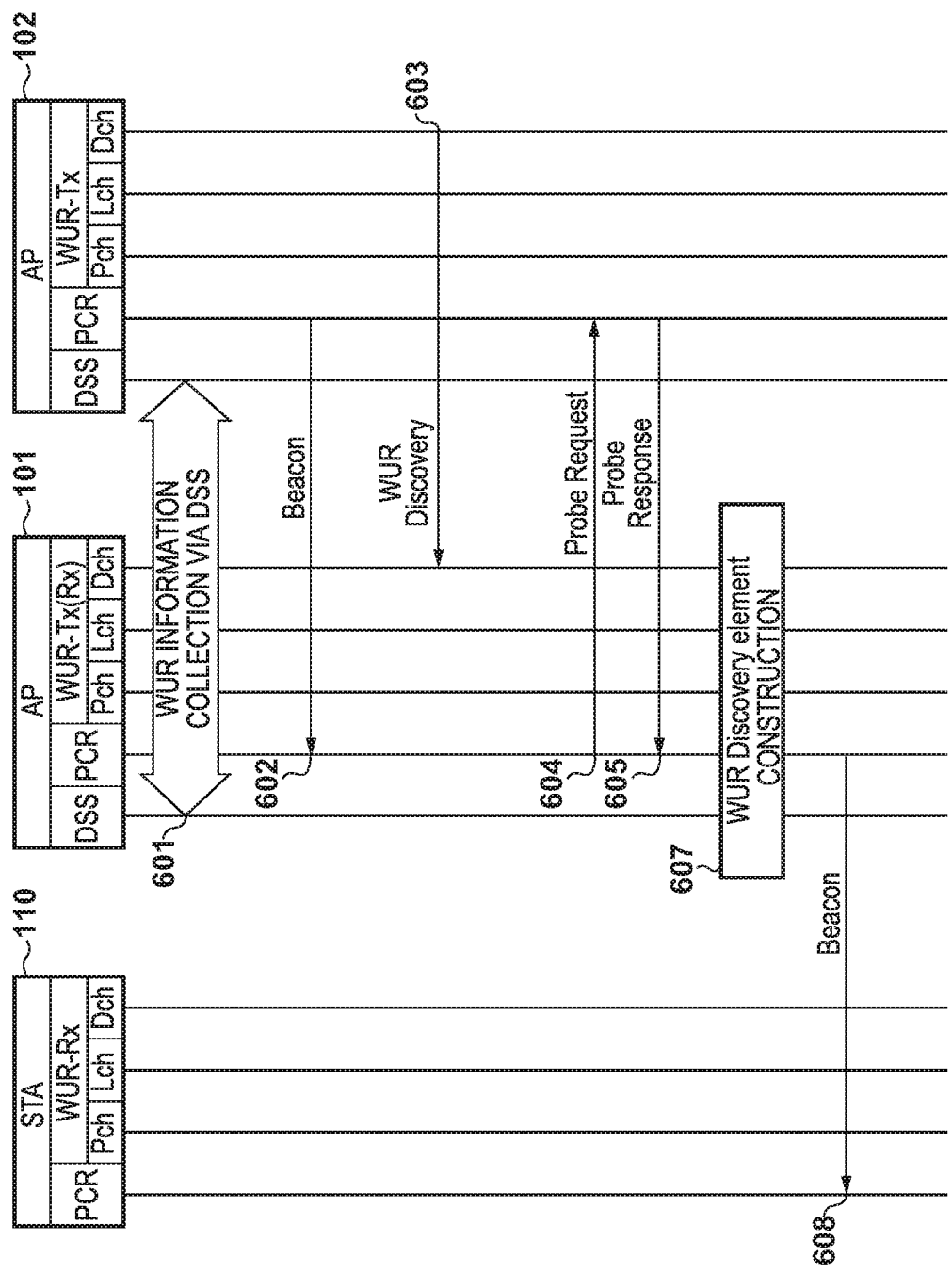
FIG. 6A is a sequence chart showing an operation sequence of wireless communication according to the embodiment.

<FIG. 6A: Neighboring WUR AP Information Collection and Beacon Notification by AP 101>

First, the AP 101 collects information of WURs of neighboring APs. A first method 601 of this collection is information collection via DSS, and this corresponds to "A: WUR information exchange protocol" shown in FIG. 1. This is a sequence performed in a case in which the AP 101 and the AP 102 are in compliance with a predefined exchange procedure for the information related to a WUR. The predefined procedure can be, for example, the use of the expansion (vendor extension) of a Multi-AP specification of Wi-Fi® which is an organization for certifying the interconnectivity of wireless LAN communication. The Multi-AP specification is a framework for controlling multiple APs, and an AP that functions as a controller and an AP that functions as an agent are defined in this framework. A controller is a logic mechanism for controlling a network formed by a plurality of APs. In addition, an agent is a logic mechanism for providing the controller with information to execute and control the control function of an AP. That is, information collection related to the WUR described above can be performed by the expanding the information exchange procedure between the controller and the agent of the Multi-AP specification. Hence, these functions can be implemented as programs in the memory unit 201.

For example, in a single Multi-AP arrangement, a controller function will operate in one AP, and the agent function will operate in all other AP. The controller and these agents can use an expansion specification to exchange unique information other than information commonly defined by Wi-Fi.

Hence, in a case in which the AP 101 and the AP 102 form a Multi-AP arrangement, the vendor extension of the controller function can be used to exchange information related to the PCR and the WUR of each AP. In this case, information related to the PCR is the compressed SSID 521 and the PCR operating channel 522. Also, the information related to the WUR is the WUR discovery channel 412, the short-SSID 422, the BSSID 423, and the WUR discovery period 424.

In this manner, the AP 101 can construct a WUR discovery element (400) by obtaining the information of a neighboring AP which supports WUR. However, the first method 601 cannot be used in a case in which the procedure for exchanging information related to the WUR among a plurality of APs has not been defined or in a case in which the vendor (the manufacturer or the seller) is different. In this case, the second, third, and fourth methods can be performed as described below.

Reference numeral 602 denotes a second method in which the AP 101 collects the information of neighboring WUR APs, and corresponds to a beacon reception method, that is, "B: Beacon of PCR communication" shown in FIG. 1. In the second method, the AP 101 collects the WUR discovery element (400) included in the beacon of the other AP. Note that, if possible, the AP 101 will receive and collect the beacon of a channel other than the PCR channel of the AP 101. This processing will be executed periodically or as needed when the AP transmission processing is not performed.

Reference numeral 603 denotes a third method for collecting information of neighboring WUR APs, and corresponds to "C: Discover Frame of WUR communication" shown in FIG. 1. The third method is a method for receiving a WUR discovery frame transmitted on Dch of WUR. In the third method, the AP 101 can execute the WUR-Rx function. Also, the WUR discovery frame can be periodically and comprehensively received by the five WUR discovery channels (channel 1 in the 2.4 GHz band and channels 40, 44, 149, and 153 in the 5 GHz band) described above.

Reference numerals 604 and 605 denote a fourth method in which the AP 101 collects information of neighboring WUR APs, and correspond to "D: Probe Response of PCR communication" shown in FIG. 1. In the fourth method, the AP 101 performs an active scan by transmitting a probe request and causing each neighboring AP to transmit a probe response. Note that the SSID included in the probe request may be the SSID of the AP 101 itself or a wildcard SSID whose value is 0 (zero) or null. The channel to which the probe request is transmitted may be the same channel as the operating channel of the AP 101 or may be a different channel.

The AP 101 can collect information related to the WURs of other APs by executing an arbitrary method among the four methods described above. After collecting the information related to the WURs, the AP 101 can construct a WUR discovery element as shown in FIGS. 4A and 4B (607).

Subsequently, the AP 101 transmits a beacon which includes the constructed WUR discovery element in a PCR beacon transmission period (608).

<FIG. 6B: PCR Connection with AP 101, WUR Operation Negotiation, and WUR Awake Operation by STA 110>

The STA 110 recognizes that the user has performed a connection operation to the AP 101 (611). The STA 110 transmits a probe request to the AP 101 (612). The AP 101 transmits, in response to this probe request, a probe response including the WUR discovery element (613).

The STA 110 determines a roaming policy (614). In this case, the time until the determination of the roaming destination, the selection criteria for when a plurality of roaming destination candidates are present, and the like are determined. The connection processing between the STA 110 and the AP 101 is executed (615). This connection processing is performed by exchanging a request and a response for authentication and association.

Next, a WUR operation negotiation procedure is executed between the STA 110 and the AP 101 (616). This is a procedure in which a WUR mode setup request is transmitted from the STA 110 to the AP 101, and the AP 101 transmits a WUR mode setup response to this request. Basically, in a case in which a request is transmitted from the STA 110 and the request is directly accepted by the AP 101, a response including the meaning of "accept" will be returned. Also, if the request value needs to be changed, the AP 101 can designate the change by the response. In addition, a response can be transmitted in a state in which a request has not been received.

In this manner, for example, the STA 110 determines the duty cycle period, the on duration, and the starting time for determining the schedule for enabling the WUR reception function (setting WUR-Rx to "ON"). In this case "on duration" indicates the time in which the WUR-Rx is set to "ON" in the duty cycle period. That is, there is a period in which the WUR-Rx is set to "OFF", thus implementing further power savings. Note that negotiation can be performed so there will be no period in which the WUR-Rx is set to "OFF". In addition, an offset value from the WUR primary channel, which is a channel to which the WUR wake-up frame is transmitted, is also present as another negotiation item.

After the WUR operation negotiation is performed as described above, the terminal transits to a WUR mode state. In this case, a WUR mode is a state in which the terminal is receiving a WUR service from the AP 101. A WUR service points to the provision of the WUR beacon, the WUR discovery frame, and the wake-up frame. It is possible to limit the WUR wake-up frame reception timing to a period in which the PCR of the STA 110 is in a doze state.

The transition of the STA 110 to the WUR mode state indicates a state in which the STA 110 transmits a frame in which the action type is "enter WUR mode request", and receives a corresponding frame from the AP 101. The corresponding frame includes "enter WUR mode response" as the action type, and the value of a status field changes to accept (0: zero). At this time, the AP 101 treats the STA 110 as being set to the WUR mode state. It will also be determined that the STA 110 has transited to the WUR mode state when the STA 110 has transmitted a frame in which "enter frame mode" is the action type and the AP 101 has returned an ack of IEEE 802.11.

At this time, the STA 110 starts the power saving function of the PCR upon transiting to the WUR mode state. Power saving is a state in which transmission/reception is not performed by setting the PCR control unit 207 to the sleep state or the doze state. In the PCR power saving state, the STA 110 will enable (ON) the WUR-Rx so that a wake-up frame can be received from the AP 101. Since the power consumption for enabling the WUR-Rx is less than the power consumption for enabling the reception in PCR, power can be saved in the overall STA 110.

The AP 101 transmits a WUR beacon on Pch (617). Note that in the IEEE 802.11ba standard, the AP 101 is to transmit the WUR beacon at an interval called TWBTT as long as an STA that requires the WUR service is present. TWBTT is an abbreviation of Target WUR Beacon Transmission Time. Also, the STA 110 will basically receive this beacon.

The AP 101 transmits the WUR discovery frame (618). The transmission interval of this frame is the WUR discovery period 424 (FIG. 4B). In FIG. 6B, it is described as if the STA 110 will constantly receive this WUR discovery frame. However, the WUR discovery frame need not be received if the STA 110 does not need this frame.

Although not described in FIG. 6B, the STA 110 in the WUR mode state will wait for the WUR wake-up frame on Lch in accordance with the with the WUR duty cycle and the on duration. The STA 110 grasps, based on the value of the WUR operation element (included in the WUR operation of FIG. 3) transmitted from the AP 101, the channel at which it can wait to receive the WUR wake-up frame.

Figure 6C:
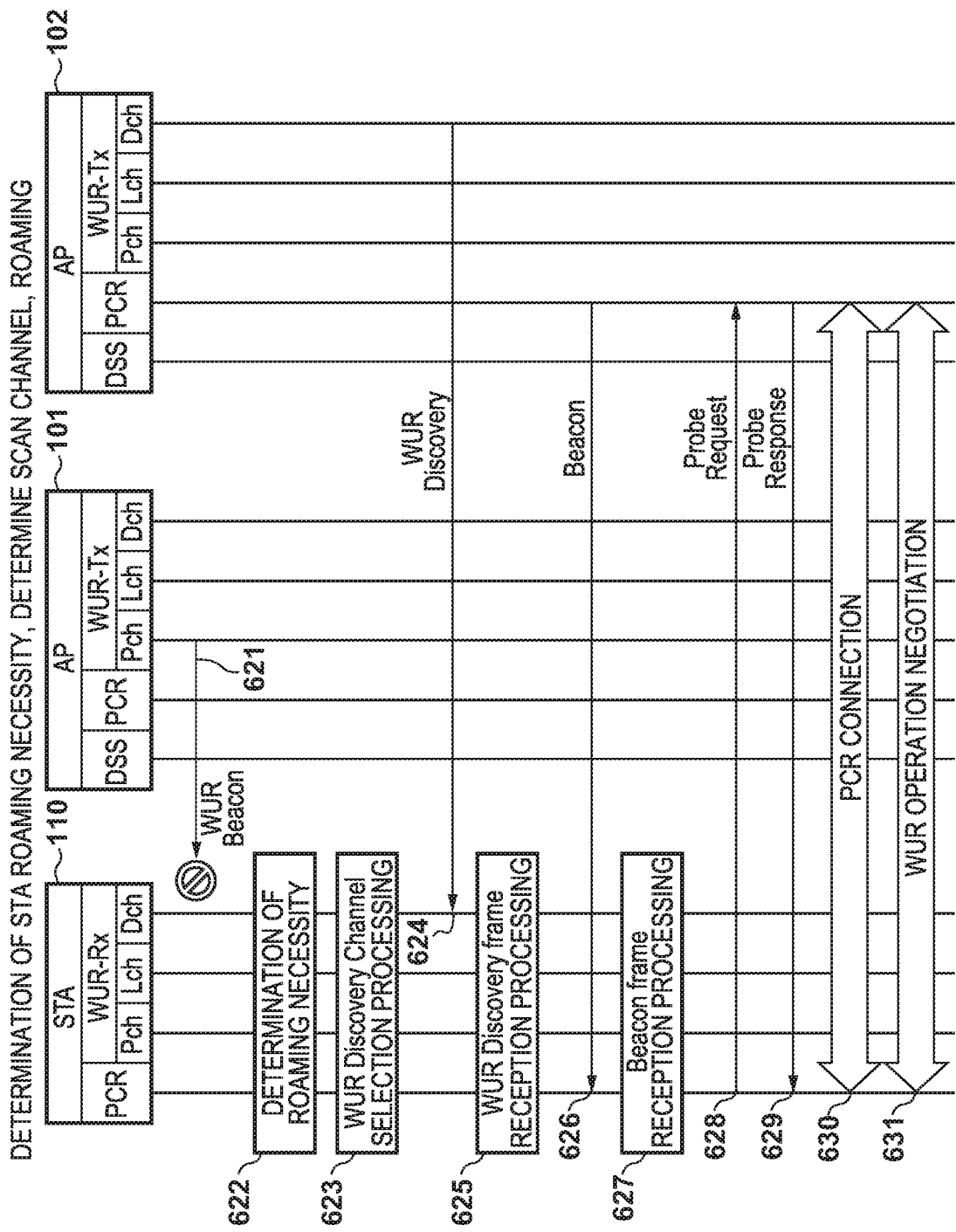
FIG. 6C is a sequence chart showing the operation sequence of wireless communication according to the embodiment.

<FIG. 6C: Roaming to AP 102 by STA 110>

Assume that a phenomenon in which the STA 110 cannot normally receive the WUR beacon of the AP 101 has occurred (621). The cause of this phenomenon may be the failure of the AP 101, a change in the propagation characteristics between the AP 101 and the STA 110 due to a change in the state of the periphery or the movement of the STA 110 or the AP 101, or the like.

In a case in which the WUR beacon from the AP 101 cannot be received normally, the STA 110 will determine the necessity of roaming (622). Determination as to whether roaming is necessary can be made based on, for example, a user setting of the STA 110. In the sequence illustrated in FIG. 6C, the STA 110 has determined that "roaming is necessary". In this case, the STA 110 will operate so as to search (scan) for an AP different from the AP 101. The STA 110 performs WUR discovery channel selection processing (623). For example, the STA 110 will select a WUR discovery channel in accordance with the order listed in the WUR AP list 414. The STA 110 will receive (624) the WUR discovery frame on Dch selected by the WUR discovery channel selection processing (623).

The STA 110 executes WUR discovery frame reception processing and determines, based on the information obtained from the received WUR discovery frame, whether to transit to a PCR beacon waiting state (625). For example, if a user setting has been set to so that PCR communication will be performed immediately with an AP after the change by the roaming, the STA 110 will transit to the PCR beacon waiting state. Upon receiving a PCR beacon (626), the STA will execute beacon frame reception processing (627). For example, the connection destination will be changed (roam) to the AP 102.

Subsequently, processes 628, 629, 630, and 631 are the same as processes 612, 613, 615, and 616 shown in FIG. 6B. Note that it may be arranged so that the roaming policy determination performed in process 614 (FIG. 6B) will be performed again after process 630. On the other hand, if the STA 110 determines not to transit to the PCR beacon waiting state as a result of the WUR discovery frame reception processing (625), the STA will, for example, switch the roaming destination to a different AP and repeat the processing described above.

An AP management table will be described with reference to FIG. 7. An AP management table 700 is table for organizing the information used for constructing a WUR discovery element. As will be described later, the AP 101 will update this AP management table 700 each time information of other APs that support the WUR operation is collected by DSS, PCR, or WUR communication.

An item 701 is an index of the AP table. The AP 101 first sets its own index to 0 (zero). Subsequently, this index will be incremented each time information of a different AP is newly obtained. When the WUR discovery element is constructed, the value of the final index will be the value of the WUR AP Count 413. An item 702 indicates the value of the transmitting WUR AP 431. In this example, the index=0 changes to "1", and the index will subsequently be set to "0". The item 703 indicates the value of the WUR discovery channel 412. An item 704 is a WUR ID of the AP that transmitted the WUR discovery frame. Although this ID is a 12-bit number, it will be described as "IDxx" in FIG. 7 for the sake of descriptive convenience.

An item 705 indicates the value of the short-SSID 422. However, if the short-SSID 422 is unknown, it will be set as 0x00, 0x00, 0x00, and 0x00 (4 octets) in the AP management table 700. An item 706 indicates the value of the BSSID 423. However, if the BSSID 423 is unknown, it will be set as 0xff, 0xff, 0xff, 0xff, 0xff, and 0xff (6 octets) in the AP management table 700. An item 707 indicates the value of the WUR discovery period 424. An item 708 indicates the most recent date and time at which the WUR discovery frame of the AP corresponding to the index has been received.

An item 709 indicates the obtainment method of the WUR discovery period. The item 709 is a "setting value" for the AP 101 itself. This indicates that the value input in step S815 (FIG. 8B) (to be described later) is a specified value/predetermined value/default value of IEEE or Wi-Fi. If "direct" is indicated in the item 709, a WUR discovery period value has been obtained by DSS or PCR communication. If "calculated" is indicated in the item 709, the WUR discovery period value has been obtained by performing a calculation based on a received plurality of WUR discovery frames. The formula can be, for example, {[item 707]+(current time−[item 708])}/2 so as to express the reception date and time of the WUR discovery frame as the current time. However, this applies to a case in which a value other than 0 is indicated in the item 707. The formula will be (current time−[item 708]) when the item 707 is zero. Note that it may be arranged so that three or more sets of the reception date and time will be held, and an average value of the differences between the sets and the respective sets of previous reception date and time will be calculated.

An item 710 indicates the value of the compressed SSID 521. An item 711 indicates the value of the operating class 531. An item 712 indicates the value of the channel 532. The AP management table 700 as described above will be updated by the processing to be described below. When the AP management table 700 is updated, the control unit 202 will generate, from the updated AP management table 700, a WUR discovery as described in FIGS. 4A and 4B, and will use a beacon to notify the STA 110.

The operation of the AP 101 will be described with reference to the flowcharts of FIGS. 8A to 8E. FIGS. 8A to 8E are flowcharts for explaining event processing performed in a steady state of the AP 101. Unless otherwise mentioned, the control unit 202 of the AP 101 is the main subject of the processes of the steps of each flowchart hereinafter. In addition, the steady state is a state after the initial settings for the operation have been completed. Furthermore, an event is a phenomenon performed by software or hardware which acts as a trigger when the AP 101 is to perform some kind of control. An event can be the expiration of a timer, exchanging of a frame, an operation on the input unit 204 by the user, or the like.

Figure 8A:
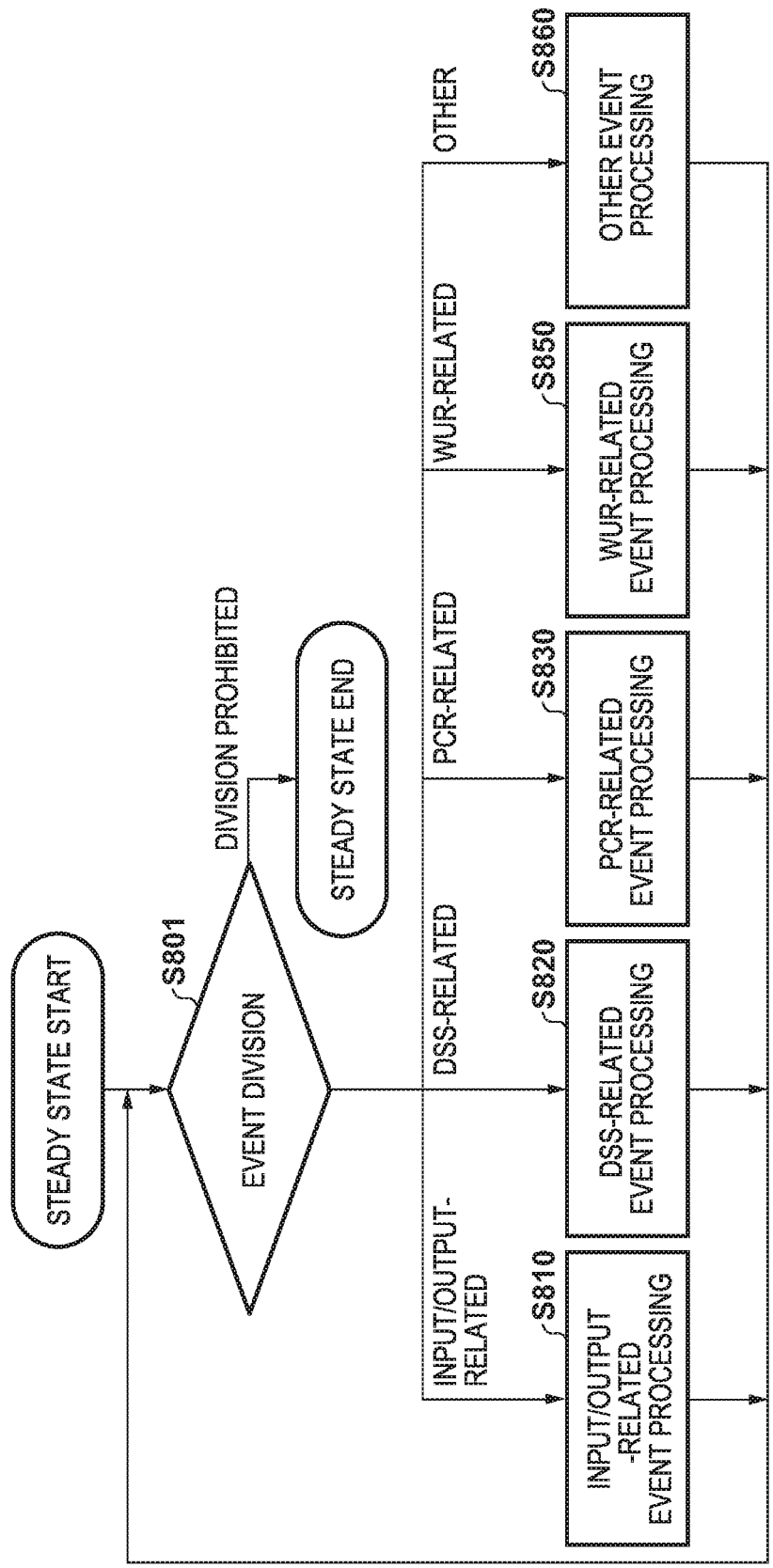
FIG. 8A is a flowchart for explaining processing by an AP according to the embodiment.

In step S801 of FIG. 8A, the control unit 202 performs first processing division in accordance with the contents of the event. This expression "first processing division" indicates that a further detailed division will be performed next. In this case, the division destination processing operations of the first processing division are "input/output-related" processing (step S810), "DSS-related" processing (step S820), "PCR-related" processing (step S830), "WUR-related" processing (step S850), and "other" processing (step S860). Note that since the "other event processing" in step S860 is not particularly important for this specification, a description thereof will be omitted. Also, a "division prohibited" event in step S801 is resetting of hardware, aborting of software, exception processing, or the like. If such an event is detected, the control unit 202 ends the steady state. The divided events will be described in detail with reference to the flowcharts of FIGS. 8B to 8E hereinafter.

<Input-Related Event Processing>

Figure 8B:
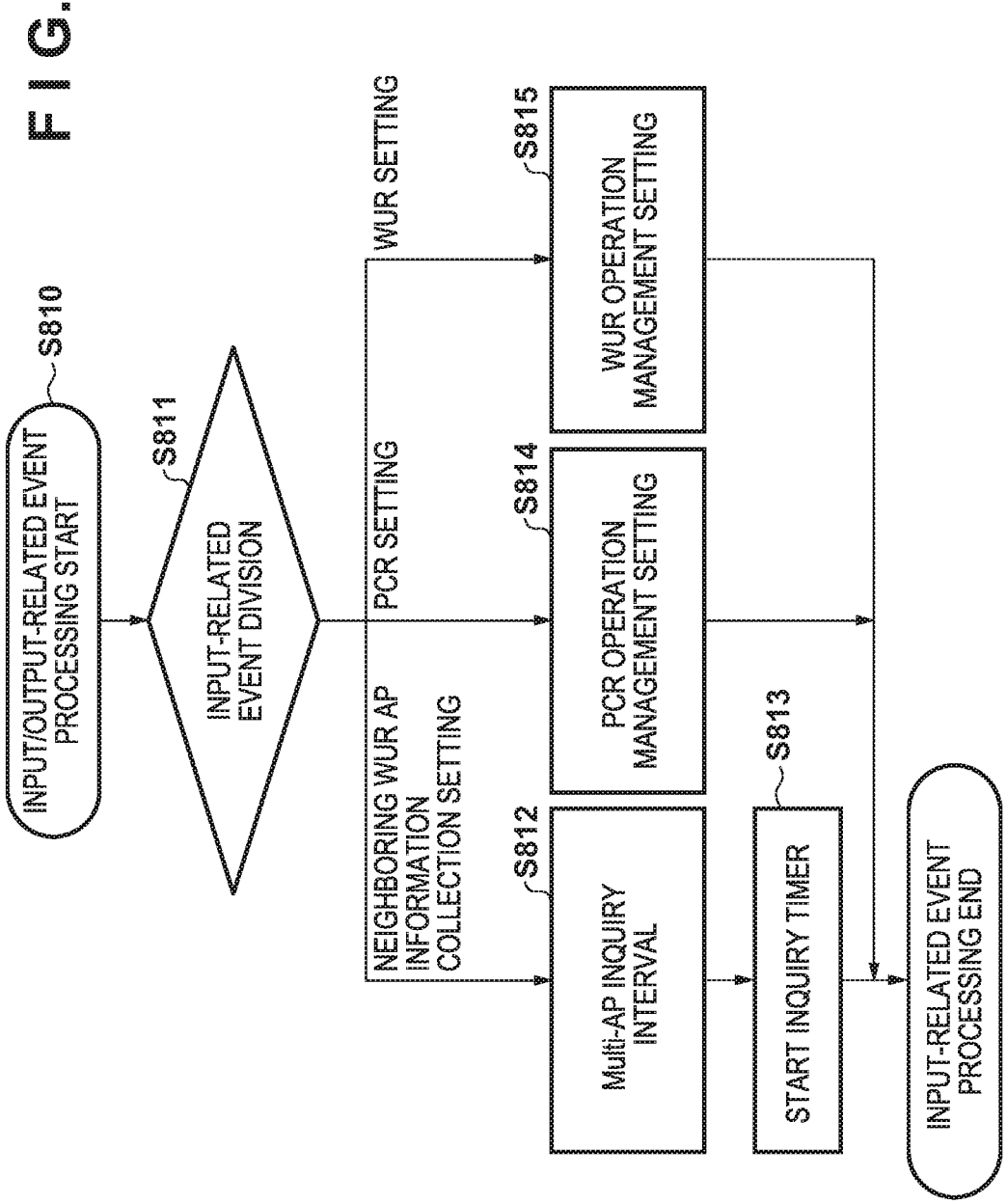
FIG. 8B is a flowchart for explaining processing by the AP according to the embodiment.

FIG. 8B is a flowchart showing the input/output-related event processing (step S810). First, in step S811, the control unit 202 performs detailed division of an input-related event. If the input-related event is an input related to neighboring WUR AP information collection setting, the process advances to step S812. In step S812, the control unit 202 sets an interval of an inquiry which is performed by using Multi-AP. This is an inquiry interval for inquiring the PCR and WUR operation state. When this inquiry interval has a value other than zero, a timer expiration event related to DSS will occur at that interval. On the other hand, if the inquiry interval value is 0 (zero), an inquiry using the function of Multi-AP will not be performed. In step S813, the control unit 202 will activate the inquiry timer.

In step S811, if the input-related event is an input related to the PCR setting, the process advances to step S814, and the control unit 202 sets the PCR operation management setting. Also, in step S811, if the input-related event is an input related to the WUR setting, the process advances to step S815, and the control unit 202 sets the WUR operation management setting. Note that in steps S814 and S815, when the information related to its own AP in the AP management table 700, that is, the information related to the row of index=0 is changed, the control unit 202 will update the AP management table 700 according to this change. Furthermore, although there are input-related events other than those described above, an illustration and a description of these events are omitted in this flowchart.

<DSS-Related Event Processing>

FIG. 8C is a flowchart showing DSS-related event processing (S820). In step S821, detailed division of the DSS-related event is performed. If the DSS-related event is a Multi-AP inquiry timer expiration event, the process advances to step S822. In this case, the inquiry interval of the Multi-AP inquiry timer is set in step S812, and the timer periodically issues a DSS-related event.

In step S822, the control unit 202 transmits an inquiry. This is an inquiry performed to inquire the PCR and WUR AP operation information of each AP forming the Multi-AP. Items other than the item 708 of the AP management table 700 shown in FIG. 7 are the operation information in this case. In step S823, the control unit 202 receives a response to the inquiry transmitted in step S822. In step S824, the control unit 202 updates the AP management table 700 based on the WUR AP operation information included in the response. The items to be updated in this process are the items 702 to 707 and the items 710 to 712 of the AP management table 700. In step S825, the control unit 202 restarts the Multi-AP inquiry timer.

On the other hand, in a case in which the DSS-related event is a data frame reception event in step S821, the process advances to step S826. In step S826, the control unit 202 registers the received data to the transmission buffer of each terminal. Note that although there are other DSS-related events as described above, an illustration and a description of these events will be omitted in the flowchart in this embodiment.

<PCR-Related Event Processing>

FIG. 8D is a flowchart showing PCR-related vent processing (step S830). In step S830a, the control unit 202 performs detailed division of the PCR-related event. When the PCR-related event is a PCR beacon timer expiration event, the process advances to step S831. The interval of the PCR beacon timer is a value designated by the PCR operation management setting (step S814). Note that in a case in which there is no particular designation, the value is set to 100 msec. In step S831, the control unit 202 generates a WUR discovery element from the AP management table 700. In step S832, the control unit 202 transmits a PCR beacon including the WUR discovery element generated in step S831. Note that although information elements such as a time stamp, an SSID, and the like will be included in the PCR beacon, the contents of these elements are generic.

In step S830a, in a case in which the PCR-related event is a beacon reception from another AP, the process advances to step S833. In step S833, the control unit 202 updates the AP management table 700 based on the contents of the WUR discovery element. The items to be updated are the items 702 to 707 of the AP management table 700. The control unit 202 also updates the item 710 based on other information elements (element) in the beacon. In a similar manner, the control unit 202 will update the items 711 and 712 based on the channel on which the beacon was transmitted.

In step S830a, in case in which the PCR-related event is a probe request reception, the process advances to step S834. In step S834, the control unit 202 generates a WUR discovery element from the AP management table 700. In step S835, the control unit 202 transmits a probe response including at least the WUR discovery element.

In step S830a, in a case in which the PCR-related event is a WUR setup request reception, the process advances to step S836. In step S836, the control unit 202 transmits a WUR setup response. In step S837, the control unit 202 updates the WUR management state in accordance with the contents of the WUR setup transmitted in step S836. A WUR duty cycle operation is included as an information item of the WUR management state. This information will allow the AP 101 to perform processing to transmit a WUR wake-up frame upon grasping the "ON" state timing of the WUR-Rx of the terminal.

In step S830a, in a case in which the PCR-related event is a PS-poll reception, the process advances to step S838. In step S838, the control unit 202 determines whether the data for the terminal that transmitted the PS-poll is registered in the transmission buffer. If the data is registered, the control unit 202 will transmit, in step S839, a data frame including this data.

In step S830a, in a case in which the PCR-related event is a free medium event, the process advances to step S840. In step S840, the control unit 202 determines whether a probe request can be transmitted. If it is determined that a probe request can be transmitted, the process advances to step S841. In step S841, the control unit 202 transmits a probe request. In step S842, the control unit 202 receives a probe response. In step S843, the control unit 202 will update the AP management table 700 based on the contents of the WUR discovery element. The items to be updates are the items 702 to 707. The control unit 202 also updates the item 710 based on other information elements included in the probe response. In a similar manner, the control unit 202 updates the items 711 and 712 based on the channel on which the probe response was transmitted.

Note that the details of this processing may be determined based on the PCR management setting performed in step S814. In this case, the details of the processing include presence/absence of the execution of this processing, the execution interval, the channel transmitting the probe request, and the like. Although the channel is generally the operational channel of the AP itself, but it may be another channel. Such a setting is allowed because the transmission of a probe request can set a wireless medium in a busy state and increase the load of the AP. For example, in case in which the user of the AP has positioned data communication as processing more important than the processing of the WUR AP information collection, settings can be made in step S814 so the processing will not be performed from step S840.

Note that although not illustrated, if the control unit detects an event in which data addressed to an accommodated terminal is received, the received data is registered in the transmission buffer. In addition, in step S833 and step S843, information in which the transmitting WUR AP 431 included in the WUR discovery element is "1" will be indicated as "0" in the item 702 (transmitting WUR AP) of the AP management table 700. Also, since the information of the AP itself can be set based on the setting information of the AP itself, the value of the WUR discovery element from another AP will not be used to update the AP management table 700. Note that although there are PCR-related events other than those described above, an illustration and a description of these events are omitted in this flowchart.

<WUR-Related Event>

FIG. 8E is a flowchart showing the WUR-related event processing (step S850). In step S851, the control unit 202 performs detailed division of the WUR-related event. In a case in which the WUR-related event is a WUR beacon timer expiration event, the process advances to step S852. In step S852, the control unit 202 transmits the WUR beacon on Pch.

In step S851, in a case in which the WUR-related event is a wake-up processing schedule event, the process advances to step S853. In this case, the WUR AP grasps the "ON" timing of the WUR-Rx of each connected terminal based on the processing procedures of steps S836 and S837. In step S853, the control unit 202 determines whether data for a terminal whose WUR-Rx is "ON" is present in the transmission buffer. If the data is present, the control unit 202 transmits, in step S854, a WUR wake-up frame on Lch.

In step S851, in case in which the WUR-related event is a WUR discovery frame timer expiration event, the process advances to step S855. In step S855, the control unit 202 transmits the WUR discovery frame on Dch. Subsequently, in step S856, the control unit 202 determines whether to wait for a WUR discovery frame from another AP. The determination as to whether to execute this wait is determined based on the WUR operation management setting made in step S815. If the determination is "wait" in step S856, the process advances to step S857, and the control unit 202 determines whether the WUR discovery frame has been received. In this manner, the AP 101 (the control unit 202) can scan for a WUR discovery frame from another access point during a period in which the AP 101 itself does not perform transmission processing for providing a WUR service.

In step S857, if it is determined that a WUR discovery frame has been received, the process advances to step S858, and the control unit 202 updates the AP management table 700 in accordance with the contents of the WUR discovery frame. The items to be updated are the items 701 to 705 and the items 707 to 709 of the AP management table 700. On the other hand, if it is determined, in step S857, that a WUR discovery frame has not been received (NO in step S857), the control unit 202 determines, in step S859, whether a predetermined time has elapsed. If a WUR discovery frame is not received within the predetermined time (YES in step S859), the processing ends.

In this case, although the channel used to wait for the WUR discovery frame is the channel used by the AP itself, it may be another discovery channel. Note that although there are other WUR-related events, an illustration and a description of these events will be omitted.

After executing these processing operations, the control unit 202 constructs a WUR discovery element from the AP management table 700, and transmits the WUR discovery element to a connection target STA by a beacon or a probe response. At this time, depending on the situation, only the WUR AP Count 413 indicating the number of APs which are to be roaming destination candidates may be clearly indicated, and the short-SSID 422, the BSSID 423, and the WUR discovery period 424 may not be present. Such information will also be valid. This is because the STA which receives this information can determine the time up to which the wait for a WUR discovery frame will be continued.

As described above, in this embodiment, the AP 101 can collect information related to WUR APs other than itself at any time and can notify, in advance, a connection-target STA of information to learn a channel on which a roaming candidate AP is operating. In this case, "at any time" points to the timing of step S824 by DSS communication, the timing of step S833 or step S843 by PCR, and the timing of step S858 by WUR communication.

OTHER EMBODIMENTS

In the above-described embodiment, the AP management table 700 is updated in every WUR-related event processing, and every piece of information is reflected onto the WUR discovery element. However, depending on the condition, the AP management table 700 may be updated for only some of the even processing operations, and only some pieces of AP information may be included in the WUR discovery element. Three modifications will be described below.

<Modification 1: When Every AP Forming Multi-AP Supports WUR Exchange Procedure>

In this condition, it may be set so that only the processes of step S822 and subsequent step will be performed. This is because information needed to form the WUR discovery element can be obtained by the WUR exchange procedure.

<Modification 2: When WUR Discovery Element Requires BSSID>

In this condition, it may be set so the processes of step S856 and subsequent steps will not be performed. This is because even if a WUR discovery frame is received, the BSSID of the AP which transmitted this frame cannot be known immediately.

<Modification 3: When Roaming Destination is AP with Same ESSID (Extended Service Set Identifier)>

In this condition, a WUR discovery element will be constructed from the information of an AP whose item 705 (short-SSID) or item 710 (compressed SSID) in the AP management table 700 is the same as that of the AP 101.

Note that the conditions exemplified in Modifications 1 to 3 can be set in the "other" input processing performed in step S816.

According to these Modifications 1 to 3, only the processing for required information obtainment and required information transmission will be performed with minimal communication processing. As a result, in addition to the effects described in the embodiment, effects such as a reduction in the load of the AP and an improvement in the use efficiency of the communication medium can be obtained.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-088573, filed May 8, 2019, which is hereby incorporated by reference herein in its entirety.

What is claimed is:

1. A communication apparatus that operates as an access point in compliance with IEEE 802.11ba and communicates with a terminal that has a WUR (Wake-Up Radio) function, comprising:
    one or more memories having instructions stored therein; and
    one or more processors that, upon execution of the instructions, are configured to:
    scan for a WUR discovery frame from another access point during a period in which the communication apparatus itself is not performing transmission processing to provide a WUR service;
    collect, based on a scan result of the scan for the WUR discovery frame, information related to a WUR of the other access point; and
    notify the terminal of the collected information related to the WUR of the other access point, before the terminal connects to the communication apparatus,
    wherein the communication with the terminal that has the WUR function at least includes communication for transitioning a terminal from a power saving state to a normal state.

2. The communication apparatus according to claim 1, wherein the one or more processors are further configured to collect the information related to the WUR by communicating with the other access point by using a DSS (Distribution System Service).

3. The communication apparatus according to claim 2, wherein the one or more processors are further configured to use an expansion of an information exchange procedure between a controller and an agent specified in Multi-AP of Wi-Fi.

4. The communication apparatus according to claim 1, wherein the one or more processors are further configured to collect the information related to the WUR by performing communication, with the other access point, in compliance with the IEEE 802.11 series standard.

5. The communication apparatus according to claim 4, wherein the one or more processors are further configured to collect the information related to the WUR from a beacon which is in compliance with the IEEE 802.11 series standard and is received from the other access point.

6. The communication apparatus according to claim 4, wherein the one or more processors are further configured to collect the information related to the WUR from a probe response received from the other access point in response to a probe request transmitted in compliance with the IEEE 802.11 series standard.

7. The communication apparatus according to claim 1, wherein the information related to the WUR of the other access point is included in a beacon and the beacon is transmitted to the terminal.

8. The communication apparatus according to claim 1, wherein the information related to the WUR of the other access point notified to the terminal includes at least a number of other access points that have the WUR function.

9. The communication apparatus according to claim 1, wherein the information related to the WUR of the other access point notified to the terminal includes information of a channel used by the other access point which has the WUR function to transmit a WUR discovery frame.

10. The communication apparatus according to claim 1, wherein the information is collected based on contents of the WUR discovery frame transmitted by the other access point included in the scan result obtained as a result of the scan.

11. A control method of a communication apparatus that operates as an access point in compliance with IEEE 802.11ba and communicates with a terminal that has a WUR (Wake-Up Radio) function comprising:
    scanning for a WUR discovery frame from another access point during a period in which the communication apparatus itself is not performing transmission processing to provide a WUR service;
    collecting, based on a scan result of the scanning, information related to the WUR of the other access point; and
    notifying the terminal of the collected information related to the WUR of the other access point, before the terminal connects to the communication apparatus,
    wherein the communication with the terminal that has the WUR function at least includes communication for transitioning a terminal from a power saving state to a normal state.

12. A non-transitory computer-readable storage medium storing a program for causing a computer to execute a control method of a communication apparatus that operates as an access point in compliance with IEEE 802.11ba and communicates with a terminal that has a WUR (Wake-Up Radio) function, the control method comprising:
    scanning for a WUR discovery frame from another access point during a period in which the communication apparatus itself is not performing transmission processing to provide a WUR service;
    collecting, based on a scan result of the scanning, information related to the WUR of the other access point; and
    notifying the terminal of the collected information related to the WUR of the other access point, before the terminal connects to the communication apparatus,
    wherein the communication with the terminal that has the WUR function at least includes communication for transitioning a terminal from a power saving state to a normal state.

* * * * *